Figure 3:
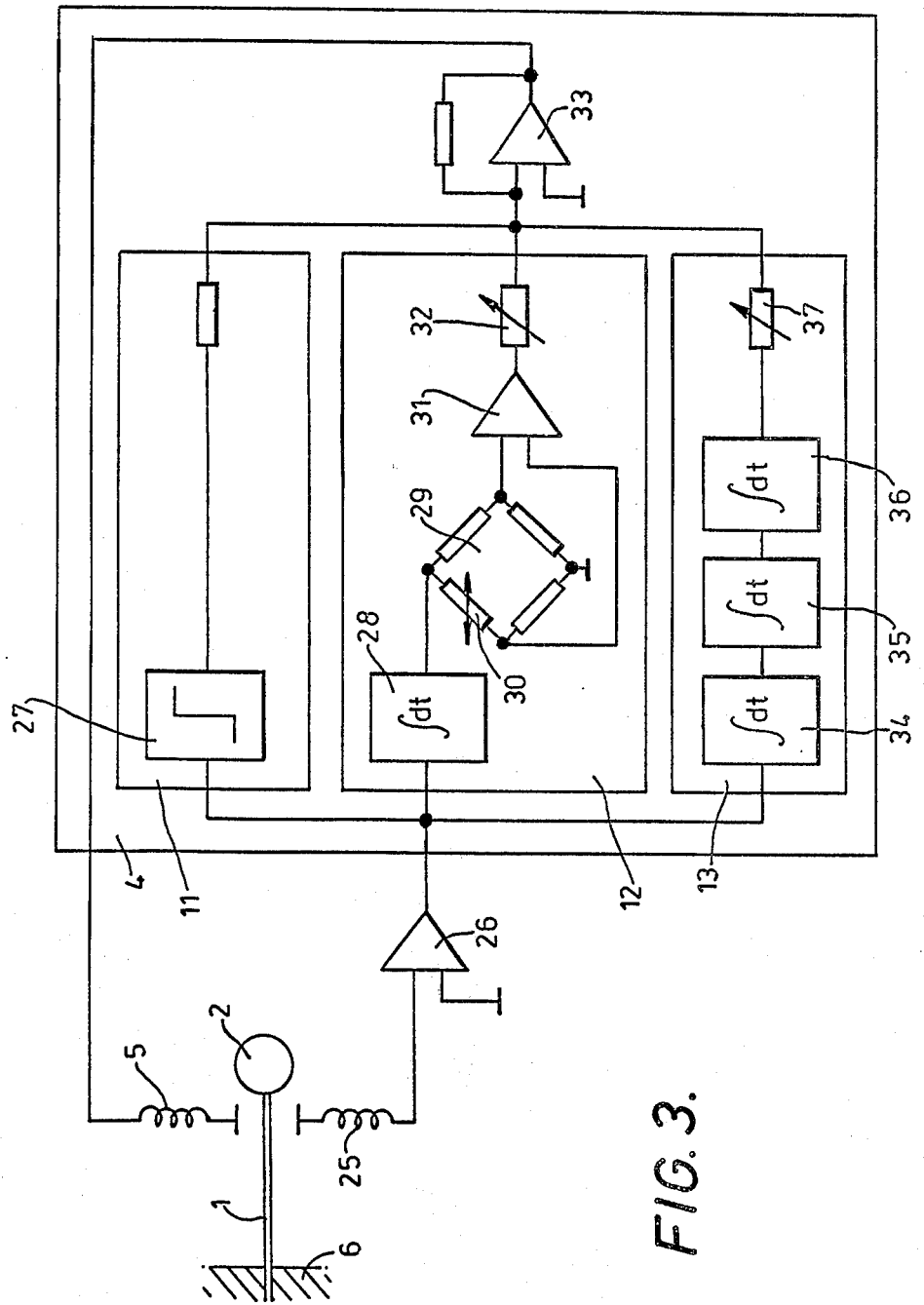

United States Patent [19]

Kratky et al.

[11] 3,910,101

[45] Oct. 7, 1975

[54] DEVICES FOR MEASURING DENSITY
[76] Inventors: Otto Kratky, Waltendorfer Haupstrasse 76e; Hans Leopold; Hans Stabinger, both of August-Musger-Gasse 4, all of A-8010 Graz, Austria
[22] Filed: May 29, 1973
[21] Appl. No.: 364,652

[30] Foreign Application Priority Data
Oct. 25, 1972   Austria .............................. 9132/72

[52] U.S. Cl. ................................................ 73/32 A
[51] Int. Cl.² ............................................ G01N 9/00
[58] Field of Search...... 73/32 R, 32 A:433, DIG. 1, 73/67.2, 30, 24

[56]   References Cited
UNITED STATES PATENTS
| | | | |
|---|---|---|---|
| 2,635,462 | 4/1953 | Poole et al. | 73/32 |
| 2,889,702 | 6/1959 | Brooking | 73/32 |
| 2,943,476 | 7/1960 | Bernstein | 73/32 |
| 3,449,940 | 6/1969 | Banks | 73/32 |

FOREIGN PATENTS OR APPLICATIONS
1,189,083   4/1970   United Kingdom..................... 73/32

OTHER PUBLICATIONS
Herwald, Westinghouse Electric Corp., Fundamentals of Servomechanisms, How to Select and Apply Them, (8 pages), 1946.

*Primary Examiner*—James J. Gill
*Assistant Examiner*—Anthony V. Ciarlante

[57]   ABSTRACT

For density determination for flowing samples, a transducer is applied in accomplishing compensation for temperature-dependency by maintaining by the transducer continuous oscillation of the oscillatory mass and by thereby also providing a second periodic force 90° phase shifted with respect to the excitation force, to the extent proportional to the amplitude of this second force, whereby amplitude has been thereby made to depend on sample-temperature in order to compensate for the temperature of the sample and oscillator.

13 Claims, 3 Drawing Figures

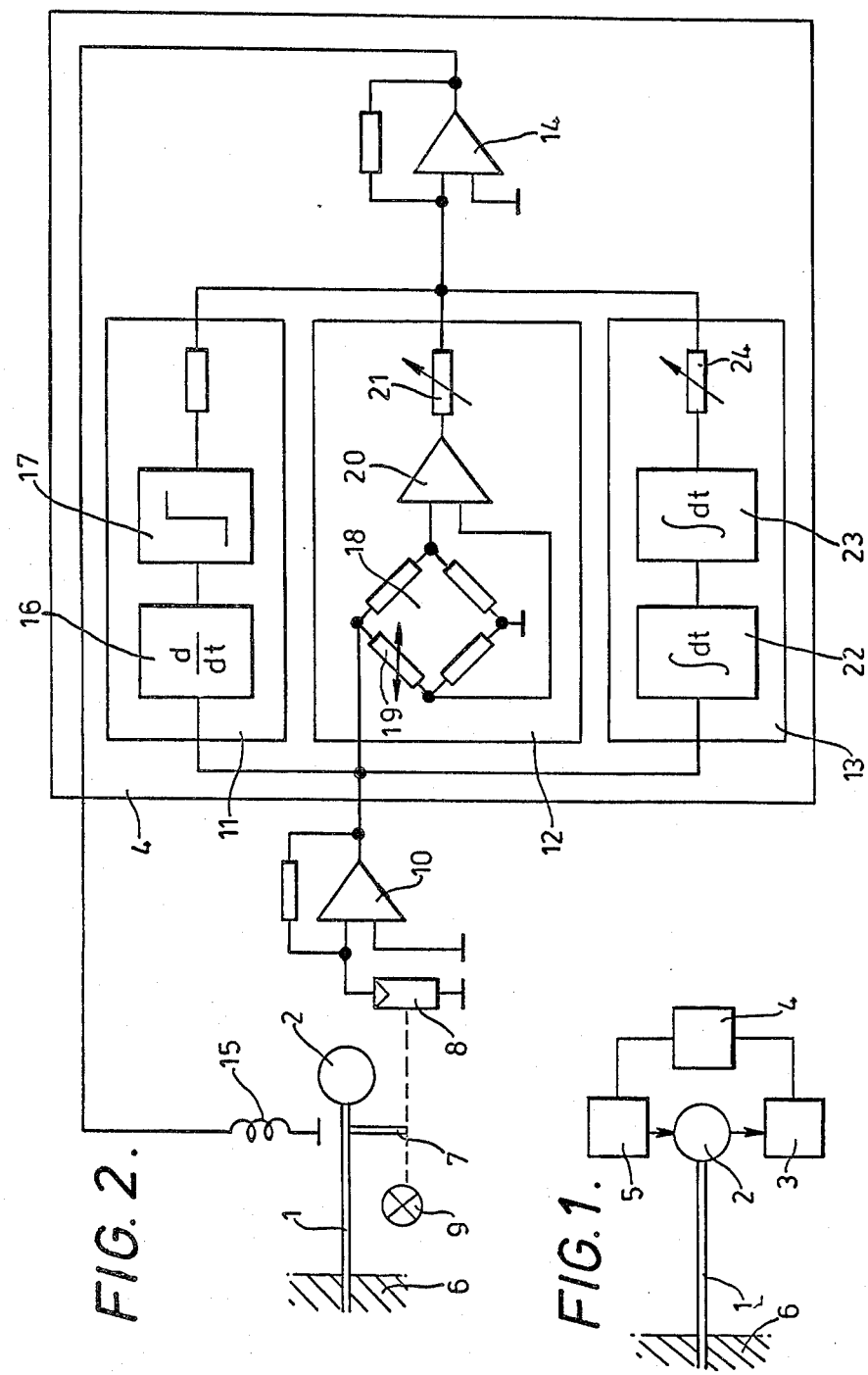

DEVICES FOR MEASURING DENSITY

This invention relates to devices for measuring density.

Our U.S. Pat. No. 3523446 describes a device for measuring density, especially of liquids and gases, based on the determination of the period of a blending-type mechanical oscillator, the oscillatory mass of which contains a measuring sample and is excited by electronic means to its resonant frequency. The oscillatory mass carries a magnetic body, and in its magnetic field there are two coils which are connected via an excitation-amplifier. The density $\rho$ of the sample can be determined from the period T by the equation:

$$\rho = A(T^2 - B)$$

A and B being calibration constants.

If the corresponding periods of two fluids of known density (for example air and water) are measured, the density of any other fluid can be determined.

As the oscillatory system comprises not only the oscillatory mass but also its suspension, the total oscillatory system can be represented by a mechanical model in which the oscillatory mass $m$ (this mass also containing the mass of the sample) and the mass M of the suspension are interconnected by a spring having a constant of elasticity $c$. For the evaluation of the density of an unknown sample based on the readings of, for example, air and water, to be accurate, the ratio $M/m$ should amount to at least $10^6$.

It is however extremely difficult to obtain such a high ratio $M/m$ by mechanical means. Moreover, the density measurements are affected by temperature.

According to the present invention there is provided a device for measuring the density of a fluid by determining the resonant frequency of a mechanical oscillator which in use contains in its oscillatory mass a measuring sample of the fluid, wherein a mechanical to electrical transducer influenced by the oscillatory mass is connected to an electrical to mechanical transducer acting on the oscillatory mass via an electronic circuit which comprises means to alter in a defined manner the phase and amplitude of the signal exciting the oscillatory mass for the purpose of compensating for temperature effects and the effect of the mass of the suspension.

The invention is based on the compensation by electronic means of the temperature coefficient and the suspension mass M. A defined influence on the constant of elasticity $c$ of the spring connecting the masses in the model will produce a behaviour of the oscillator corresponding to a ratio $M/m \to \infty$ (compensation of the suspension mass) and a compensation for alteration of the temperature coefficient (temperature compensation).

To excite and maintain the oscillation a periodic force in phase with the amplitude of velocity must act on the oscillator. The excitation system has to provide this force. Forces in phase with the displacement do not contribute to maintaining the oscillation but in effect alter the frequency-determining parameters $c$ and $m$. According to the invention a temperature compensation is obtained by controlling the amplitude of this periodic force in accordance with the temperature in a way that the changes caused by ambient temperature changes are eliminated.

In order to obtain a compensation for the suspension mass M the amplitude of the force acting in phase with the displacement is made proportional to the square of the period, resulting in a period of oscillation of an oscillator of arbitrary mass $m$ corresponding to an infinite suspension mass M.

The invention will now be further described by way of example with reference to the accompanying drawings, in which:

FIG. 1 shows a block diagram of a device according to the invention (for the sake of simplicity the period meter is not shown), FIG. 2 shows a device with a transducer sensitive to displacement, and FIG. 3 shows a device using a transducer sensitive to velocity.

In FIG. 1 the oscillator is formed by a bending-type oscillator 1 carrying a hollow sphere 2 containing the measuring sample. The oscillator 1 acts on a mechanical to electrical transducer 3 which is connected via an electronic circuit 4 to an electrical to mechanical transducer 5 acting in turn on the oscillator 1. The electronic circuit 4 comprises an amplifier forming part of a feedback loop to excite the oscillator 1 to its resonant frequency.

As the period of the oscillator 1 is not only dependent on the density of the measuring sample but also on the temperature and the magnitude of the suspension mass 6, the electronic circuit 4 contains an electronic device altering the amplitude and phase of the excitation signal in order to compensate for these influences. This results in the resonant frequency being determined only by the density of the measuring sample. The transducers 3 and 5 and the electronic circuit 4 can be embodied in various manners. Two examples are shown in FIGS. 2 and 3.

The example of FIG. 2 uses an opto-electronic system for the mechanical to electrical transducer. A diaphragm 7 connected to the oscillator 1 defines the amount of light from a light source 9 reaching a photodiode 8, thereby sensing the amplitude of the displacement of the oscillator 1. The photodiode 8 forms the input of an amplifier 10, the output of which is connected to a summing amplifier 14 via three different parallel-connected branches 11, 12 and 13. The output of the summing amplifier 14 is fed to the excitation coil forming the electrical to mechanical transducer 15 which impresses a force corresponding to the signal sensed by the opto-electronic system comprising the diaphragm 7, the photodiode 8 and the light source 9.

The branch 11 comprises a differentiator 16 in series with a limiter 17 in order to maintain the oscillation. The signal proportional to the magnitude of the velocity obtained by differentiation of the amplitude of the displacement is limited in order to keep the oscillatory amplitude constant.

Branch 12 contains a bridge circuit 18 with a temperature dependent arm 19. The bridge circuit 18 is connected to an amplifier 20, the output of which is connected to the summing amplifier 14 via a variable resistor 21. The bridge circuit 18 generates a signal proportional to any change of temperature. The variable resistor 21 permits compensation of the temperature coefficient.

Branch 13 comprises two integrators 22 and 23 in series and a variable resistor 24. In order to obtain a compensation for the suspension mass the signal in phase with the displacement is made proportional to the square of the period by double integration and is fed via the variable resistor 24 to the input of the summing amplifier 14.

The example of FIG. 3 uses a magneto-dynamic system 25 as the mechanical to electrical transducer, connected to an amplifier 26 and thence to electronic circuit 4.

In this case also the electronic circuit 4 comprises three parallel-connected branches 11, 12 and 13; branch 11 serves to maintain the oscillation, branch 12 compensates for the temperature and branch 13 for the effect of the suspension mass.

As in this case the magneto-dynamic system 25 forms a velocity sensitive transducer. Only a limiter 27 is necessary to maintain the oscillation. To obtain temperature compensation the velocity dependant signal is brought via an integrator 28 to the bridge circuit 29 with its temperature dependent arm 30 connected via an amplifier 31 and a variable resistor 32 to the summing amplifier 33. For the same reason the branch 13 has three integrators 34, 35 and 36 connected to the summing amplifier 31 via a variable resistor 37.

The invention is not restricted to the examples mentioned here. The opto-electronic set-up of FIG. 2 can be replaced by other mechanical to electrical transducers sensitive to displacement, for example electrostatic transducers with voltage loading, piezoelectric transducers or strain gauges. In the same way the magneto-dynamic system of FIG. 3 can be replaced by other mechanical to electrical transducers sensitive to velocity, for example electrostatic transducers with current loading.

The excitation coil forming the electrical to mechanical transducer 5 can be replaced by, for example, electrostatic, magnetostrictive, piezoelectric or similar transducers.

The temperature dependant bridge circuit can be replaced by an analog multiplier which multiplies the compensation signal by a temperature dependant voltage.

The determination of the density is performed, as mentioned, by measuring the period of oscillation. This can be done in any suitable way, therefore the corresponding components of the device are not included in the drawings.

What we claim is:

1. A device for measuring the density of a fluid by determining the resonant frequency of a mechanical oscillator which in use contains in its oscillatory mass a measuring sample of fluid, wherein a mechanical to electrical transducer influenced by the oscillatory mass is connected to an electrical to mechanical transducer acting on the oscillatory mass via an electronic circuit which comprises means to alter to a predetermined degree the phase and amplitude of the signal exciting the oscillatory mass for the purpose of compensating for predetermined temperature-change and the effect of the mass of the suspension.

2. A device according to claim 1 wherein said means comprises a temperature-dependent branch.

3. A device according to claim 2 wherein the temperature-dependent branch comprises a bridge circuit.

4. A device according to claim 3 wherein said means comprises a branch containing two integrators.

5. A device according to claim 1 wherein the mechanical to electrical transducer is formed by a transducer sensitive to the velocity of the oscillatory mass, and wherein said means comprises a branch containing a limiter.

6. A device according to claim 5 wherein the velocity sensitive transducer is a magneto-dynamic transducer or an electrostatic transducer with current loading.

7. A device according to claim 6 wherein said means comprises a temperature-dependent branch.

8. A device according to claim 7 wherein the temperature-dependent branch comprises a bridge circuit in series with an integrator.

9. A device according to claim 8 wherein said means comprises a branch containing three integrators.

10. A device according to claim 1 wherein said means contains a temperature-dependent branch including a variable resistor for adjusting the temperature coefficient to be compensated.

11. A device according to claim 10 wherein said means contains a branch for compensating the mass of the suspension, said branch including a variable resistor for adjusting the compensation.

12. A device according to 11 wherein said means comprises a plurality of branches and a summing amplifier to the input of which said branches are connected, the output of the summing amplifier being connected to the electrical to mechanical transducer.

13. A device for measuring the density of a fluid by determining the resonant frequency of a mechanical oscillator which in use contains in its oscillatory mass a measuring sample of the fluid, wherein a mechanical to electrical transducer influenced by the oscillatory mass is connected to an electrical to mechanical transducer acting on the oscillatory mass via an electronic circuit which comprises means to alter temperature dependently the phase and amplitude of the signal exciting the oscillatory mass for the purpose of compensating for the temperature coefficient of period of the filled oscillator.

* * * * *